Patented June 8, 1954

2,680,677

UNITED STATES PATENT OFFICE 2,680,677

PROCESS FOR GROWING QUARTZ CRYSTALS

Edward C. Broge, Cecil County, Md., and Ralph K. Iler, Gordon Heights, Wilmington, Del., assignors to E. I. du Pont de Nemours & Company, Wilmington, Del., a corporation of Delaware No Drawing. Application February 28, 1951,
Serial No. 213,294

6 Claims. (Cl. 23—301)

This invention relates to the preparation of crystalline silica and is more particularly directed to processes wherein an aqueous sol of amorphous silica is heated under pressure to produce crystals of alpha quartz.

It is known that various forms of silica can be dissolved in water at high temperatures and pressures and slowly redeposited upon a suitable nucleus such as crystalline quartz with resultant growth of the crystal. Dissolution of the silica can be aided by the addition of an alkali such as sodium hydroxide, but the concentration of most ionic impurities in the system must be kept very low in order to obtain the prefect crystals required for such uses as in piezoelectric crystals.

The processes heretofore employed for the growth of quartz crystals have been subject to a number of disadvantages. Early methods attempted to take advantage of the fact that amorphous forms of silica are more soluble than quartz so that if the two are heated in the presence of water under isothermal conditions the amorphous silica should go into solution and be redeposited upon the less soluble quartz crystals. This process actually occurs quite rapidly, initially, causing some growth of the quartz nuclei. The process comes to a halt rapidly, however, because the nutrient amorphous silica itself quickly crystallizes in situ to a crystalline mass of low solubility. In order to obtain any appreciable growth of the seed crystals in such a system, it is necessary to interrupt the process repeatedly, remove the crystalline mass, and add fresh amorphous silica to serve as nutrient material. The same problem has arisen whether the amorphous silica used was in the form of silica gel, fused silica glass, or other amorphous forms. Furthermore, it is difficult to prepare such amorphous forms of silica in a sufficiently pure state to permit their use as nutrients for the growth of perfect quartz crystals.

More recently, attempts have been made to develop improved processes for the growth of large synthetic quartz crystals, using natural crushed quartz crystals as the nutrient material. A temperature gradient is maintained in the disolution zone. The nutrient material is held at the higher temperature and thus has a greater tendency to dissolve and redeposit upon selected quartz nuclei held at the lower temperature. While it is possible to grow perfect synthetic quartz crystals by this method, since the nutrient material exists in very pure form, the availability of such pure natural quartz crystals, even of the very small variety used as the nutrient, is very limited. Since the quartz nutrient material used in this process has a relatively low solubility, it is necessary to maintain high temperatures and presure in the dissolution zone, as well as relatively large amounts of alkali, over such long periods of time as two weeks to a month, in order to effect any considerable dissolution and redeposition of the quartz upon seed crystals.

Now, according to the present invention an improved method has been found which permits using, as a nutrient for growing alpha quartz crystals, a readily available, highly pure, inexpensive, amorphous silica in the form of an aqueous sol containing dense, colloidal particles larger than 10 millimicrons in diameter, the sol being particularly suited to provide continuous release of soluble silica within the system as rapidly as perfect quartz crystals can be grown under high pressure hydrothermal conditions. The method comprises feeding the amorphous silica sol under pressure into a closed system containing super-colloidal crystalline alpha quartz nuclei, maintaining the system at a temperature of 300 to 550° C. and a pressure above 1200 p. s. i. g. whereby the amorphous silica is dissolved and deposited as crystalline alpha quartz on the nuclei, and venting the spent solution at such a rate as to keep the pressure above 1200 p. s. i. g. In a preferred aspect, directed to obtaining rapid quartz growth, alkali is present in the system. The alkali may be added to the silica sol before the latter is fed into the system, but at least a portion of it is preferably added to the system, simultaneously with the sol but separately therefrom.

According to the present invention a sol of amorphous silica, the particles of which range in size from about 10 to 150 millimicrons in diameter, is used as the nutrient material for the production of a crystalline silica. In a preferred aspect of the invention the silica particles are in the colloidal range and have an average diameter of from 10 to 100 millimicrons. Although particles from 100 to 150 millimicrons in diameter may be used, they offer no particular advantages, are more difficult to prepare and maintain in dispersion, and require longer to pass into true solution in the reaction system.

If a sol, as described, is supplied under heat and pressure to suitable nuclei, then one may build up large crystals which are synthetic alpha quartz. The conditions of temperature and pressure can be substantially those heretofore used in the art, tho considerable variation is permissible. Alkali may be present as is the case in some prior art processes.

The system may be maintained under isothermal conditions, but it is generally preferred to maintain a small temperature differential, the quartz nuclei being at a slightly lower temperature. Any spurious crystalline material is dissolved in the higher temperature zone. Complete temperature uniformity, or exact control of the temperatuer gradient is not required since the process is controlled essentially by the rate of feed of the nutrient sol into the reaction system.

*The nutrient silica sols*

The aqueous sols used according to the invention are those having particle sizes ranging from about 10 to 150 millimicrons in diameter and being composed of dense particles.

A silica sol ion-exchange effluent, prepared as in the Bird Patent 2,244,325, is composed of silica particles well below 10 millimicrons in diameter. This sol and other similar sols prepared by prior art methods and which have small diameter particles are quickly precipitated by heat and pressure to form a gel. They are, accordingly, unsuitable for use as nutrient sols until further treated. If such a sol were used, then a gel would be obtained and this would be undesirable to utilize in the processes of this invention.

In contrast to such sols it is possible to prepare very stable highly concentrated silica sols containing dense discrete particles having an average diameter above about 10 millimicrons and it is these sols which are used as feed in the present invention. A preferred sol may be made by heating a silica sol, prepared by ion-exchange in the manner described in Bird 2,244,325, to a temperature above 60° C. and adding further quantities of the same type of sol until at least five times as much silica has been added to the original quantity as was at first present. The process is fully set out in Bechtold and Snyder U. S. Patent 2,574,902. The product thus produced is stable against gelation at high temperatures and pressures and it contains discrete silica particles having a molecular weight, as determined by light-scattering, of more than one-half million. The particle sizes are in excess of about 10 millimicrons and range upwardly to about 130 millimicrons. The particles in a particular sol are surprisingly uniform in size, but the size can be varied depending upon the process conditions under which they were formed.

The particles in the sol are quite dense. This may be shown by drying the particles and then determining the amount of nitrogen adsorption. From the nitrogen adsorption it may be determined that the particles have a surface area not greatly in excess of that computed from the particle size as determined by electron micrographs. It will be evident that if the particles are not dense, but rather are porous, then they will be penetrated by nitrogen and the apparent surface as determined by nitrogen adsorption will be much higher than that expected from the particle diameters. Nitrogen adsorption, accordingly, affords an easy measure of the density of the particles.

In determining the surface areas of silica particles by the electron microscope and the surface areas by nitrogen adsorption it is necessary to avoid changes such as coalescence or changes in the degree and nature of the polymerization of the particles which may be effected in the preparation of the sample. This is minimized by diluting the sol, adjusting the pH to the acidic range of 3–4, and allowing the water to evaporate at moderate temperatures, preferably at room temperature under vacuum. Thus, the electron micrograph particle sizes referred to in this description are the sizes of particles as observed with an electron microscope on a sample originally containing 0.1–0.25% $SiO_2$ in water at a pH of about 3.5 and dried at 25° C. under vacuum. The particle counts are made from electron micrographs taken at 5000 diameters magnification enlarged to 25,000 diameters by conventional photographic printing techniques and finally projected on a screen to a total magnification of about 250,000 diameters. Methods of mounting the samples, and counting and measuring the particles are described by J. H. L. Watson in an article entitled "Particle Size Determinations with Electron Microscopes" in Analytical Chemistry, volume 20, pages 576–584 for June 1948. The method of calculating particle size distribution is described in an article by L. R. Sperberg and H. M. Barton in Rubber Age, volume 63, pages 45–51 for April 1948.

The samples for determination of nitrogen adsorption are similarly prepared except, of course, dilution is not required. The method of determining the surface area by nitrogen adsorption is described in a "A New Method for Measuring the Surface Areas of Finely Divided Materials and for Determining the Size of Particles" by P. H. Emmett in Symposium on New Methods for Particle Size Determination in the Subsieve Range in the Washington Spring Meeting of A. S. T. M., March 4, 1941.

Summarizing then, the preferred sols for use as starting materials according to the present invention have particles of such density that the surface area as determined by nitrogen adsorption is not greatly in excess of that computed for the particle size as determined by examination of an electron micrograph and the adsorption should not be more than about 30 per cent greater than that computed from the apparent particle sizes.

Sols prepared as above described, having a silica:alkali ratio of from 60:1 to 130:1 may be used as the nutrient sol. This ratio refers to the weight ratio of total silica expressed as $SiO_2$ to total alkali expressed as $Na_2O$. It will be understood that if potassium is used instead of sodium, a chemically equivalent amount should be used.

As the method for making the original, low molecular weight sol, from which the nutrient sol containing dense particles is subsequently prepared, the process of the Voorhees Patent 2,457,971 can be used instead of that of the Bird patent. Similarly, other methods of preparing a silica sol of low molecular weight can be used to make the starting sol which is then further treated by the method of Bechtold and Snyder for the preparation of a sol containing dense particles.

Particularly preferred colloidal silica sols which may be prepared according to the process of Bechtold and Snyder have the following characteristics: The sols are practically clear having only a slight opalescence. They are stable indefinitely under ordinary conditions of storage and for months at 95° C. Electron microscopic examination shows that the sols contain substantially spherical, discrete, non-agglomerated, dense, ultimate, particles of amorphous silica, substantially all of which have an average diameter in the range of from 15 to 30 millimicrons and at least 80% of which have an average diameter in the range of 0.5 to 1.7 times the arithmatic mean particle diameter. The sols have an absolute viscosity of 2.0 to 3.3 centipoises as measured directly at 25° C. and a relative viscosity of 1.15 to 1.55 as measured at 10% $SiO_2$ concentration and a pH of 10. When the silica sols are adjusted to a pH of 3.5 with dilute HCl and evaporated to dryness, the resulting powder possesses a specific surface area as measured by nitrogen adsorption of from 80 to 200 m.$^2$/g. The mol ratio of $SiO_2$:$Na_2O$ in the sols is from 80:1 to 100:1 and the pH of the sol is from 9.5 to 10.5. The specific gravity of the sol at 60° F. is from 24.3 to 26.1° Bé. The freezing point of the sols is 32° F. The silica particles have a molecular weight as determined by light scattering of the sol of more than 1,000,000 and less than 100,000,000. The sols have an extinction coefficient of less than 0.25 for light of a wave length of 400 millimicrons. The sols have the following chemical analysis: $SiO_2$, 29–30%; titratable alkalinity as $Na_2O$, 0.29–0.39%; sulfates as $Na_2SO_4$, 0.15% maximum.

When it is desired that the silica sols be exceedingly pure for the preparation of the very highest grade crystals, the sols prepared by the method of Bechtold and Snyder may be substantially completely deionized by treatment both with a cation-exchanger in its hydrogen form and with an anion-exchanger in its basic form according to the method fully set forth in the copending application of Frederick J. Wolter, Serial No. 97,090, filed June 3, 1949. Such sols may be used in the process of this invention. The particularly preferred deionized sols will contain particles of the type and size distribution of those of Bechtold and Snyder just described, and the relative viscosity of the sols will be in the range of 1.15 to 1.55 as measured at 10% $SiO_2$ and pH 10.0. The sols contain no more than a trace of electrolytes, the anion content other than OH being lowered below 0.01% and the cation content being reduced below 0.05%. The specific conductance of such sols is less than $4 \times 10^{-4}$ mho/cm. at 28° C. and 10% $SiO_2$.

Such sols may be further stabilized to facilitate storage and handling and provide an excellent source of silica for the present invention by the addition of enough alkali metal hydroxide to give a silica:alkali oxide mol ratio of from 130:1 to 500:1, as described in Rule U. S. Patent 2,577,485.

According to the Rule process it is possible to produce aqueous silica sols which are stable, practically clear sols containing amorphous silica in the form of dense, non-agglomerated, spherical particles having an average particle diameter of 10–150 millimicrons, in a concentration of from 35% to upward of 50% $SiO_2$ by weight. The sols have a silica:alkali oxide mol ratio of from 130:1 to 500:1, a relative viscosity of from 1.15 to 1.55 as measured at 10% $SiO_2$ and pH 10, and a specific conductance, as measured at 10% $SiO_2$ and 28° C. of less than $$\frac{(10,000+30)}{R} \times 10^{-5} \text{ mho/cm.}$$

where R is the silica:alkali oxide mol ratio.

Instead of the sols as above described which have extremely dense particles and very uniform particle size, one may use the somewhat less dense and non-uniform type of product which can be made by precipitation of a silica gel and redispersion with alkali at elevated temperature under pressure. Such a process is described, for instance, in the White Patent 2,375,738. The purity of these products is not as easily controlled and for applications in which extreme purity is desired or in which it is particularly desired to build large, pure crystals the products are less satisfactory than the ones previously mentioned. They can, however, be used by heating under pressure to produce a crystalline form of silica.

Still other silica sols may be used if they are sols of amorphous particles which have a size from about 10 to 150 millimicrons and are reasonably dense. It is this latter property which sharply distinguishes them from suspensions of finely dispersed silica gels. It is to be observed that the particles in all of the silica sols suggested as suitable are amorphous. Accordingly, any of the prior art sols may be used if they are not of such small particle size and molecular weight and concentration that they will immediately be converted to a gel or precipitate under heat and pressure.

A silica sol may advantageously be used which is essentially free from salts. This may be prepared, for instance, by dialysis as well as by the deionization with ion-exchangers already disclosed.

The concentration of the sol may vary widely though it will generally be desirable to use as concentrated a sol as can be handled. The sols of the type above-described are particularly well suited for use as nutrient sols because they can be used at relatively high concentrations, and may, for instance, be fed into the pressure vessel at as high as 10% $SiO_2$. The concentration considerations will be more fully discussed below.

*The growth of alpha quartz*

The growth of crystalline, alpha quartz from amorphous silica sols such as those described above may be carried out in a closed system such as an autoclave, bomb, pipeline, or other vessel capable of withstanding the pressures, temperatures and alkalinity of the process, by heating the sols to the desired temperature and pressure range in the presence of a crystalline alpha quartz nucleus, the colloidal amorphous particles going into solution and being redeposited on the nucleous as crystalline quartz. It is advantageous to employ a temperature differential in this system with the nucleous at the lower temperature. The process may be carried out by initially charging the bomb with any form of pure silica in such amounts as will dissolve completely at the maximum temperature, pressure and degree of alkalinity to be employed in the process, to yield a solution having a concentration approximately equal to the solubility of quartz under these conditions. Colloidal silica sol may then be added to the system at the optimum temperature, pressure and alkalinity at such a rate that a saturated solution of silica is maintained, i. e., the rate at which silica is continuously deposited as the much less soluble crystalline alpha quartz on one or more of such nuclei.

For example, at 400° C. and 1,000 atm. pressure in an aqueous solution containing about 1% $Na_2O$ there may be dissolved at least about 3 to 3.5% $SiO_2$ based on the weight of water in the system. This corresponds approximately to the concentration of silica initially placed in the bomb for this particular set of conditions. Much larger quantities of silica than required to saturate the solution are not preferred for use as a heel since the excess silica would then have the opportunity to precipitate or crystallize in situ, forming new crystalline nuclei of lower solubility which would interfere with continued growth on the individual nuclei originally introduced into the system. The concentration of the silica in the initial solution must not be very much lower than the above-mentioned solubility if the process of crystal growth is to proceed at a practical rate, and, indeed, it must not be less than the solubility of quartz under the conditions of the experiment or the process will be reversed and the quartz crystal will dissolve.

Similar considerations apply to the concentration of the sol which is added to the bomb as feed during the course of the process. The amount of silica fed into the bomb is very readily controlled by controlling the rate of feed and the concentration of silica in the sol. The higher the concentration of the silica, the lower the rate of feed required to keep the solution in the bomb saturated with soluble silica. It is necessary that the concentration of silica in the feed solution be at least somewhat greater than the solubility of silica under the conditions of the process. Concentrations which are very high should be avoided since they require very low feed rates which are difficulty to control and since such sols are more susceptible to coagulation or precipitation in the inlet tubes during the course of the process. For feed sols containing silica particles in the range of 10–20 millimicrons, it is generally desirable to maintain the concentration at or below about 10% $SiO_2$. Somewhat higher concentrations may be used of sols containing larger particles. In general it is preferable to use the highest concentration at which the proper feed rate can be maintained since this avoids excessive throughput of the reagents.

As has already been pointed out, the solubility of silica increases in the presence of alkali and it is desirable to maintain at least a small concentration of alkali in the system in order to obtain a substantial rate of growth of the quartz crystals. Since alkali may be continuously removed from the system in the process of venting the excess solvent, it is generally desirable to add alkali, as well as silica sol, to the bomb. When maximum growth rates are desired it is preferred to use larger amounts of alkali than those already present in the above-mentioned sols. In such cases, it is preferred to feed in the alkali simultaneously with, but separately from, the silica sol. This may be done through separate inlet tubes. This procedure is desirable to reduce the tendency of the sol to crystallize in the presence of the high temperature, high pressure and alkali before it has passed completely into the bomb, and thus to avoid plugging of the inlet tubes.

Thus, although the sols of Bechtold and Snyder containing a silica:alkali ratio of from 60:1 to 130:1 may be used in this process, it is preferred to use in the feed-in steps of the process the salt-free sols of the Rule U. S. Patent 2,577,485, having an $SiO_2:Na_2O$ ratio of 130:1 to 500:1, or especially the Rule sols having $SiO_2:Na_2O$ ratios of 300:1 to 500:1. Alternatively, it is especially preferred to use the completely deionized sols described in the Wolter application Ser. No. 97,090.

During the process of continuously feeding in alkali and colloidal silica, while bleeding off excess solvent from the bomb, the bomb may be maintained under isothermal conditions. The growth of quartz crystals at the expense of the colloidal amorphous material is possible because of the considerable difference in solubility between the crystalline and amorphous forms of silica. However, it is often preferably to maintain a temperature differential in the bomb with the seed crystals of quartz at the lower temperature in order to avoid the formation of spurious quartz crystals or small amounts of silica precipitate in the bomb. In the temperature differential system, any such materials would tend to settle to the lower, hot end of the bomb and would there dissolve and later redeposit on the quartz nuclei in the cooler portions of the bomb.

The pressures used may be those heretofore employed by the art in the conversion of crushed quartz or silica gels to large quartz crystals. Generally, the pressures may be described as superatmospheric and ordinarily they will exceed about 1200 lbs./sq. in. gauge, the pressure of saturated steam at 300° C.

Ordinarily the pressures most conveniently used in the "bomb" type of reactor will be greater than those which result from simply heating the sol in a partially filled, closed receptacle. The pressures, thus, will be greater than that corresponding to the vapor pressure at the temperatures used. Pressure accordingly is preferred above the critical pressure of water which is slightly over 217 atmospheres. Pressures above 500 atmospheres and preferably above 750 atmospheres will ordinarily be desired since the solubility of silica is considerably greater and crystallization more rapid at such pressures and at temperatures above 300° C. The pressures may be increased by the addition of silica sol or water to the reactor through a pump. Because of present day equipment limitations it is not practical to use pressures much higher than about 2000 atmospheres at the temperatures here involved.

Temperatures from 300° up to 550° C. are preferably used. Temperatures above 550° C. are not preferred because they approach the transition temperature for alpha quartz which is 573° C. The higher temperatures also require the use of highly special steels in the fabrication of bombs and autoclaves resistant to such extreme conditions. Temperatures below about 300° C. are not preferred since the growth rate of quartz becomes negligible at temperatures below this range.

The solubility of silica increases with the increase in temperature and pressure until the critical temperature is reached. Above the critical temperature the solubility again increases with temperature but only if the pressure is much higher than the critical pressure.

The amount of alkali in the system will usually be of the order of 1% $Na_2O$ or less. There is no particular advantage in going to systems containing amounts of alkali much in excess of 1% since this concentration is adequate to provide for a very rapid rate of solution of the amorphous silica particles; there is no increase in the difference in solubility of the amorphous and crystalline forms but the solubility of quartz may be increased enough to seriously interfere with its crystallization. The lower the concentration of alkali in the system, in general, the lower the growth rate, and the higher the temperature required to convert the amorphous silica to quartz. However, even the completely deionized colloidal silica sols to which no free alkali has been added may be converted to quartz by using temperatures in the range of 500° C. and pressures in the range of 1,000 atmospheres.

Alkalis other than sodium hydroxide may be used, for example, the hydroxides of lithium or potassium, alkaline salts such as sodium carbonate, and the like. The well-known mineralizing agents such as fluorides which tend to influence the character and rate of formation of the crystals may also be added if desired. Instead of fluorides, still other additions may be made. There may be used, for instance, organic compounds such as those shown by G. Van Traagh, Geological Magazine, 84, 98–100, 1947. Such organic materials may be included, for instance as sodium oleate, gelatin, and stearin.

Instead of growing the massive quartz crystals by the preferred method described above, it is possible to load the bomb initially with very many small crystalline nuclei such as those found in crushed alpha quartz. These can then be caused to grow in the presence of the amorphous silica sols in the continuous feed systems already described. In this way it is possible to grow small crystals to a controlled size.

The synthetic quartz crystals grown in the manner described herein can be used for any of the purposes for which natural or synthetic alpha quartz crystals have heretofore been employed. They may be used in the preparation of piezo-electric crystals. They may be used wherever quartz of the highest quality is required in the form of relatively large crystals or plates cut from such crystals.

The smaller quartz crystals resulting from the formation and growth of many crystalline nuclei in the solution and subsequent separation as by filtration can be used as abrasives, filters for plastics, rubber, paper and a variety of other materials. They may also be used as catalyst carriers and for incorporation into paints, waxes and other finishing materials.

The processes of the present invention have the advantages of permitting the use of readily available, highly pure, inexpensive amorphous silica as source material for the growth of synthetic perfectly formed, highly pure, alpha quartz crystals. The processes have the further advantage that they permit for the first time the continuous supply of silica in its relatively more soluble, amorphous form into the reaction system, so that the crystal growth may be carried out in a continuous commercially practical manner, the size of the quartz crystals grown being limited only by the dimensions of the apparatus.

The invention will be better understood by reference to the following illustrative examples:

*Example 1*

This example illustrates the method of simultaneous continuous feed of a colloidal amorphous silica sol and, separately, a solution of alkali, into an autoclave under conditions such that continuous growth of crystalline quartz nuclei results.

The apparatus consists of an autoclave fitted with two high pressure feed-in lines and a high pressure bleeder valve. Each of the feed-in lines is connected to a pressurizer fitted with a precision, screw-driven piston to permit injecting the silica sol and the alkali into the autoclave under the high pressures at which the quartz growth is carried out. The autoclave, or "bomb," is heated at the bottom only, in such a way as to maintain an automatically controlled temperature differential as measured by thermocouples placed in wells at various heights in the side of the bomb. A Bourdon type pressure gauge is attached to the bomb to permit continuous reading of the pressure.

In a typical run, four flat quartz seed plates weighing about one gram each and cut from a large quartz crystal parallel to the CT crystal axis are suspended at different levels in the upper half of the bomb. The bomb is then filled to the top, with a silica sol of the Rule type described in column 5, which has been diluted to an $SiO_2$ concentration of 3% and adjusted to contain 1% $Na_2O$ by the addition of sodium hydroxide. Sodium oleate (.005%) is added to improve the crystal growth.

The bomb is then sealed and heated at the bottom until the temperature of the lowest thermocouple is 450° C., liquid being bled off slowly to maintain the pressure at 1,000 atmospheres as the bomb heats up. The temperature gradient is such that the uppermost thermocouple shows about 360° C. The actual temperature gradient within the bomb is much less than that measured outside because of strong convective currents in the fluid. Several hours are required to raise the bomb to the optimum temperature and permit the contents to reach equilibrium conditions.

A sol of the type described in column 5, but diluted only to 10% $SiO_2$, and containing particles having an average diameter of about 15 millimicrons and an $SiO_2:Na_2O$ ratio upwards of about 300:1 is then fed as nutrient into the bomb under pressure through one of the inlet tubes. The rate of feed is 0.05 cc. per minute, which is roughly equivalent to the growth rate of the quartz nuclei in the system. Simultaneously, a solution of alkali containing 2% $Na_2O$ is fed in through the other inlet tube at the same rate, in order to maintain the alkali content in the system at about 1% $Na_2O$. An amount of spent alkaline solution equal to the sum of the volumes of the two solutions being added is bled off in order to keep the pressure in the system constant.

The process is carried out continuously over a period of two weeks under these conditions and the bomb is then cooled and the crystals removed. At the end of this time each of the crystal nuclei is greatly increased in size, having grown until it weighs over 30 times as much as the weight of the original seed.

*Example 2*

This example illustrates the method of feeding a colloidal amorphous silica sol containing alkali into an autoclave under conditions such that continuous growth of quartz nuclei results.

The apparatus was similar to that described in Example 1 except that only one of the inlet tubes and its pressurizer were required. Four weighed quartz seed plates were suspended at different levels in the upper half of the bomb, which was filled with 183 ml. of a Wolter colloidal silica sol like that described in column 5, but adjusted, by dilution and addition of more sodium hydroxide, to contain 3% $SiO_2$, 1.04% $Na_2O$, and .005% sodium oleate.

The bomb and contents were heated at the bottom so that the bottom, middle, and top thermocouples registered 478° C., 395° C., and 347° C., respectively. The pressure in the system was maintained between 10,000 and 12,000 p. s. i. gauge. In reaching these pressure conditions, 72 ml. of liquid had to be bled slowly from the bomb during heat up.

After the maximum equilibrium temperature and pressure was reached, a total of 60 ml. of a colloidal silica sol like that used as the heel in the bomb and also containing 0.005% sodium oleate was injected into the bomb slowly at the rate of about 0.10 ml. per minute. During this feed-in process an equal volume of spent solution was bled off. The actual feed-in required only ten hours, but the bomb was held at 478° for a total of 49 hours.

The four crystals grew in size and weight, the weight gains being 18, 52, 20 and 27% respectively.

This application is a continuation-in-part of our co-pending United States patent application Serial No. 102,138, filed June 29, 1949, (now abandoned) for: Process and Product.

We claim:

1. In a process for the treatment of amorphous silica with heat at a temperature of about 300 to 500° C. and pressure above 1200 p. s. i. g. to form crystalline silica at below pH 13 the improvement which comprises supplying the silica to a nucleus of crystalline alpha quartz in the form of an aqueous sol of dense, amorphous silica particles from 10 to 150 millimicrons in diameter.

2. A process for the production of crystalline silica at below pH 13 comprising heating to a temperature of about 300° to 550° C. at a superatmospheric pressure above about 1200 p. s. i. g. a sol of dense, amorphous silica particles from 10 to 150 millimicrons in diameter in the presence of a nucleus of crystalline alpha quartz.

3. In a process for growing alpha quartz crystals, the steps comprising feeding an aqueous sol of dense, amorphous silica particles from 10 to 150 millimicrons in diameter, into a closed system containing a crystalline alpha quartz nucleus larger than 100 millimicrons in diameter, maintained at a temperature of 300 to 550° C. and a pressure above 1200 pounds per square inch, guage, whereby the amorphous silica is dissolved and deposited as crystalline alpha quartz on the nucleus, and venting the spent solution from the system.

4. In a process for growing alpha quartz crystals, the steps comprising feeding an aqueous sol of dense, amorphous silica particles from 10 to 100 millimicrons in diameter, into a closed system containing a crystalline alpha quartz nucleus larger than 100 millimicrons in diameter, maintained at a temperature of 300 to 550° C. and a pressure above 1200 pounds per square inch, guage, the silica sol being added at such a rate as to maintain a saturated solution of silica in the system, whereby the dissolved silica is deposited as crystalline alpha quartz on the nucleus, and venting the spent solution at a rate such that the pressure is maintained above 1200 pounds per square inch, guage.

5. In a process for growing alpha quartz crystals, the steps comprising feeding an aqueous sol of dense, amorphous silica particles from 10 to 100 millimicrons in diameter, and simultaneously but separately feeding an aqueous solution of an alkali, into a closed system containing a crystalline alpha quartz nucleus larger than 100 millimicrons in diameter, maintained at a temperature of 300 to 550° C. and a pressure above 1200 pounds per square inch, guage, the alkali solution being added at such a rate as to maintain an alkali concentration equivalent, on a molar basis, to 1% of $Na_2O$ in the system, and the silica sol being added at such a rate as to maintain a saturated solution of silica in the system, whereby the dissolved silica is deposited as crystalline alpha quartz on the nucleus, and venting the spent solution at a rate such that the pressure is maintained above 1200 pounds per square inch, guage.

6. In a process for growing alpha quartz crystals, the steps comprising feeding an aqueous sol of dense, amorphous silica particles from 10 to 100 millimicrons in diameter having an $SiO_2$:alkali mol ratio upwards of 300:1, and simultaneously but separately feeding an aqueous solution of an alkali, into a closed system containing a crystalline alpha quartz nucleus larger than 100 millimicrons in diameter, maintained at a temperature of 300 to 550° C. and a pressure above 1200 pounds per square inch, guage, the alkali solution being added at such a rate as to maintain an alkali concentration equivalent, on a molar basis, to 1% of $Na_2O$ in the system, and the silica sol being added at such a rate as to maintain a saturated solution of silica in the system, whereby the dissolved silica is deposited as crystalline alpha quartz on the nucleus, and venting the spent solution at a rate such that the pressure is maintained above 1200 pounds per square inch, guage.

References Cited in the file of this patent

UNITED STATES PATENTS

| Number | Name | Date |
|---|---|---|
| 1,506,118 | Govers | Aug. 26, 1924 |
| 2,467,341 | Seymour | Apr. 12, 1949 |

OTHER REFERENCES

Kerr et al.—"Recorded Experiments in the Production of Quartz," Bulletin of the Geological Society of America, vol. 54, Supp. 1, April 1943, pages 13 and 14.